US010659128B2

(12) United States Patent
Cirkic et al.

(10) Patent No.: US 10,659,128 B2
(45) Date of Patent: May 19, 2020

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Mirsad Cirkic, Linköping (SE); Jonas Fröberg Olsson, Ljungsbro (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 7 days.

(21) Appl. No.: 16/099,927

(22) PCT Filed: May 19, 2016

(86) PCT No.: PCT/SE2016/050456
§ 371 (c)(1),
(2) Date: Nov. 8, 2018

(87) PCT Pub. No.: WO2017/200439
PCT Pub. Date: Nov. 23, 2017

(65) Prior Publication Data
US 2019/0140726 A1    May 9, 2019

(51) Int. Cl.
*H04B 7/06*       (2006.01)
*H04L 1/00*       (2006.01)
*H04W 24/10*      (2009.01)
*H04B 7/0456*     (2017.01)
*H04L 5/00*       (2006.01)

(52) U.S. Cl.
CPC ........ *H04B 7/0626* (2013.01); *H04B 7/0486* (2013.01); *H04B 7/065* (2013.01);
(Continued)

(58) Field of Classification Search
CPC .... H04B 7/0626; H04B 7/065; H04B 7/0647; H04B 7/0645; H04B 7/0617;
(Continued)

(56) References Cited

U.S. PATENT DOCUMENTS

2014/0211646 A1    7/2014   Ji et al.
2017/0041880 A1*   2/2017   Ouchi .................. H04W 16/32
(Continued)

FOREIGN PATENT DOCUMENTS

EP    1 761 097 A2    3/2007
EP    1 986 349 A1    10/2008
(Continued)

OTHER PUBLICATIONS

International Search Report and Written Opinion of the International Searching Authority for International Application No. PCT/SE2016/050456 dated Feb. 14, 2017.
(Continued)

*Primary Examiner* — Vinncelas Louis
(74) *Attorney, Agent, or Firm* — Sage Patent Group

(57) ABSTRACT

Embodiments herein relate to a method performed by wireless device for applying a Channel State Information, CSI, filtering in a wireless communication network. The wireless device determines a recommended CSI filtering based on measurements of one or more received reference signals from a radio network node. The wireless device transmits, to the radio network node, a first indication of the determined recommended CSI filtering. The wireless device receives, from the radio network node or another radio network node, a first configuration of CSI filtering; and uses the received first configuration for applying CSI filtering.

21 Claims, 9 Drawing Sheets

(52) U.S. Cl.
CPC ......... *H04B 7/0617* (2013.01); *H04B 7/0645* (2013.01); *H04B 7/0647* (2013.01); *H04L 1/00* (2013.01); *H04L 1/0026* (2013.01); *H04L 5/0048* (2013.01); *H04W 24/10* (2013.01); *H04B 7/0456* (2013.01)

(58) Field of Classification Search
CPC ... H04B 7/0486; H04B 7/0456; H04W 24/10; H04L 1/00; H04L 5/0048; H04L 1/0026
See application file for complete search history.

(56) References Cited

U.S. PATENT DOCUMENTS

2017/0063503 A1\* 3/2017 Liu .................. H04L 25/03
2017/0373743 A1\* 12/2017 Park ................ H04B 7/0626

FOREIGN PATENT DOCUMENTS

| | | |
|---|---|---|
| EP | 3 018 832 A1 | 5/2016 |
| WO | WO 2004/004173 A1 | 1/2004 |
| WO | WO 2012/136450 A1 | 10/2012 |
| WO | WO 2014/113760 A1 | 7/2014 |
| WO | WO 2016/064317 A1 | 4/2016 |
| WO | WO 2016/120454 A1 | 8/2016 |

OTHER PUBLICATIONS

Communication Regarding European Search Report for European patent application No. EP 16 90 2556 dated Apr. 2, 2019, 3 Pages.

\* cited by examiner

RADIO NETWORK NODE, WIRELESS DEVICE AND METHODS PERFORMED THEREIN

CROSS REFERENCE TO RELATED APPLICATION

This application is a 35 U.S.C. § 371 national stage application of PCT International Application No. PCT/SE2016/050456, filed on May 19, 2016, the disclosure and content of which is incorporated by reference herein in its entirety.

TECHNICAL FIELD

Embodiments herein relate to a wireless device, a radio network node and methods performed therein for communication. Furthermore, a computer program and a computer readable storage medium are also provided herein. In particular, embodiments herein relate to handling CSI filtering in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (P-GW), a Serving Gateway (S-GW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises eNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface. The radio network nodes are also connected by means of the S1 interface to the EPC, more specifically to the MME by means of an S1-MME interface and to the S-GW by means of an S1-U interface.

The S1-MME interface is used for control plane between eNodeB/E-UTRAN and MME. The main protocols used in this interface are 51 Application Protocol (S1-AP) and Stream Control Transmission Protocol (SCTP). S1AP is the application layer protocol between the radio network node and the MME and SCTP for example guarantees delivery of signaling messages between MME and the radio network node.

Time-filtering with respect to Channel State Information (CSI), also called CSI filtering, has been discussed in 3GPP for several years. An example of a time-discrete filter is where output values y[t_n] is a function of input values x[t_i], i<=n according to a formula $$y[t\_n]=a*y[t\_(n-1)]+(1-a)*x[t\_n],$$

where a is a filtering coefficient/parameter. The t_i are discrete time instances, where i is an integer. Up to release 12 of 3GPP specifications, time-filtering with respect to CSI has not been strictly regulated leading to that different wireless devices behave differently. This has made it difficult to design proprietary coordination features since coordination potential depends on which wireless devices are involved in the coordination.

In coming Release 13 specification a radio network node or a core network node has the capability to turn off any filtering with respect to CSI which is believed to enable an improved potential for coordination features.

Although time-filtering is bad in the context of coordination, time-filtering may be good other contexts to obtain good performance. For example, time-filtering may mitigate effect of channel estimation errors or filter away fast-fading variations of the channel that cannot be followed by the link adaptation.

The radio network node or the core network node sometimes performs time-filtering of the reported CSI to filter away fast-fading variations that cannot be or is not desired to be followed by the link adaptation. This means that CSI need to be reported often enough to make time-filtering meaningful which in turn means a higher reporting cost than if filtering would have been performed in the wireless device.

The amount of time-filtering that is optimal depend on several things such as
- Coordination feature, which is a set of features when multiple radio network nodes make a coordinated decision about something e.g. coordinated scheduling when e.g. 2 or more radio network nodes jointly choose who to schedule.
- Speed of the wireless device
- CSI reporting periodicity
- Location of the wireless device, i.e. how does the radio environment look like The amount of filtering that is optimal may further depend on type of CSI reporting scheme. A possible future CSI reporting scheme where improvements to the Release 13 "filtering on/off capability" can be achieved is the following:

The wireless device is configured with two types of CSI feedback:
- Feedback 1: The wireless device may feedback CSI as a n×p beamforming matrix F, where n is the number of transmit antennas on the radio network node and where p is the number of ports, which also is assumed to equal the number of antennas of the wireless device. Feedback 1 is herein denoted as a beamforming matrix and thus refers to a port-to-antenna mapping, which represents the precoder of the reference signals;
- Feedback 2: The wireless device may further perform another CSI feedback comprising a p×r pre-coding matrix P, where r is a proposed transmission rank and where p is the number of ports, and one or more Channel Quality Indicator (CQI) values. Feedback 2 is herein denoted as a precoding matrix.

For Feedback 1 the wireless device estimates the n×p full channel H based on a full-dimension Channel State Indicator Reference Signal (CSI-RS), where the reported beamforming matrix F consists of the p strongest right-singular vectors of H. For Feedback 2 the wireless device evaluates a p-port CSI-RS beamformed using the beamforming matrix F to find a best pre-coding matrix P from a pre-coding codebook. A transmission to the wireless device combines both the beamforming matrix and the pre-coding matrix such as that the received p×1 vector y at the wireless device is described as $$y=HFPx+n,$$

where x is a r×1 vector of data symbols and n is a p×1 vector of received interference and noise.

Since reporting of F is typically much more costly than reporting of P, as F is a larger matrix and therefore the number of possible different Fs is larger, thus a representation for different Fs requires more bits, it is desired to let F to capture the slow-varying part of the channel while letting P capture the faster variations. Time filtering of the CSI for channel estimate can be used to filter away the fast variations in the channel while preserving the more stable long term spatial properties of the channel. What is considered fast respectively slow will be relative to both entities, e.g., affordable CSI reporting periodicity, known by the radio network node and entities, e.g., speed of the wireless device, known by the wireless device that may lead that a time filtering of the CSI is used that is not the optimal time filtering and thereby limiting the performance of the wireless communication network.

SUMMARY

An object of embodiments herein is to provide a mechanism for improving performance of the wireless communication network in an efficient manner.

According to an aspect the object is achieved by a method performed by a wireless device for applying a CSI filtering in a wireless communication network. The wireless device determines a recommended CSI filtering based on measurements of one or more received reference signals from a radio network node. The wireless device transmits, to the radio network node, a first indication of the determined recommended CSI filtering. The wireless device receives, from the radio network node or another radio network node, a first configuration of CSI filtering; and uses the received first configuration for applying CSI filtering.

According to another aspect the object is achieved by a method performed by a radio network node for handling a CSI filtering in a wireless communication network. The radio network node receives, from a wireless device, a first indication of a recommended CSI filtering and determines a first configuration of CSI filtering based on the received recommended CSI filtering. The radio network node further transmits, to the wireless device, the determined first configuration.

According to yet another aspect the object is achieved by providing a wireless device for applying a CSI filtering in a wireless communication network. The wireless device is configured to determine a recommended CSI filtering based on measurements of one or more received reference signals from a radio network node. The wireless device is further configured to transmit, to the radio network node, a first indication of the determined recommended CSI filtering. The wireless device is also configured to receive, from the radio network node or another radio network node, a first configuration of CSI filtering; and to use the received first configuration for applying CSI filtering.

According to still another aspect the object is achieved by providing a radio network node for handling a CSI filtering in a wireless communication network. The radio network node is configured to receive, from a wireless device, a first indication of a recommended CSI filtering. The radio network node is further configured to determine a first configuration of CSI filtering based on the received recommended CSI filtering; and to transmit, to the wireless device, the determined first configuration.

It is furthermore provided herein a computer program comprising instructions, which, when executed on at least one processor, cause the at least one processor to carry out any of the methods above, as performed by the radio network node or the wireless device. It is additionally provided herein a computer-readable storage medium, having stored thereon a computer program comprising instructions which, when executed on at least one processor, cause the at least one processor to carry out the method according to any of the methods above, as performed by the radio network node or the wireless device.

Embodiments herein introduce an efficient manner of enabling selection of an optimum or more appropriate CSI filtering by coordinating selection of CSI filtering between the wireless device and the radio network node. Embodiments herein may thus enable reduced feedback cost, e.g. reducing the feedback of beamforming matrix, when CSI filtering is beneficial. The method thus utilizes knowledge from both the radio network node and the wireless device that enables, e.g. in some embodiments, optimization of the CSI reported to the radio network node leading to an improved performance of the wireless communication network.

BRIEF DESCRIPTION OF THE DRAWINGS

Embodiments will now be described in more detail in relation to the enclosed drawings, in which.

DETAILED DESCRIPTION

Figure 1:
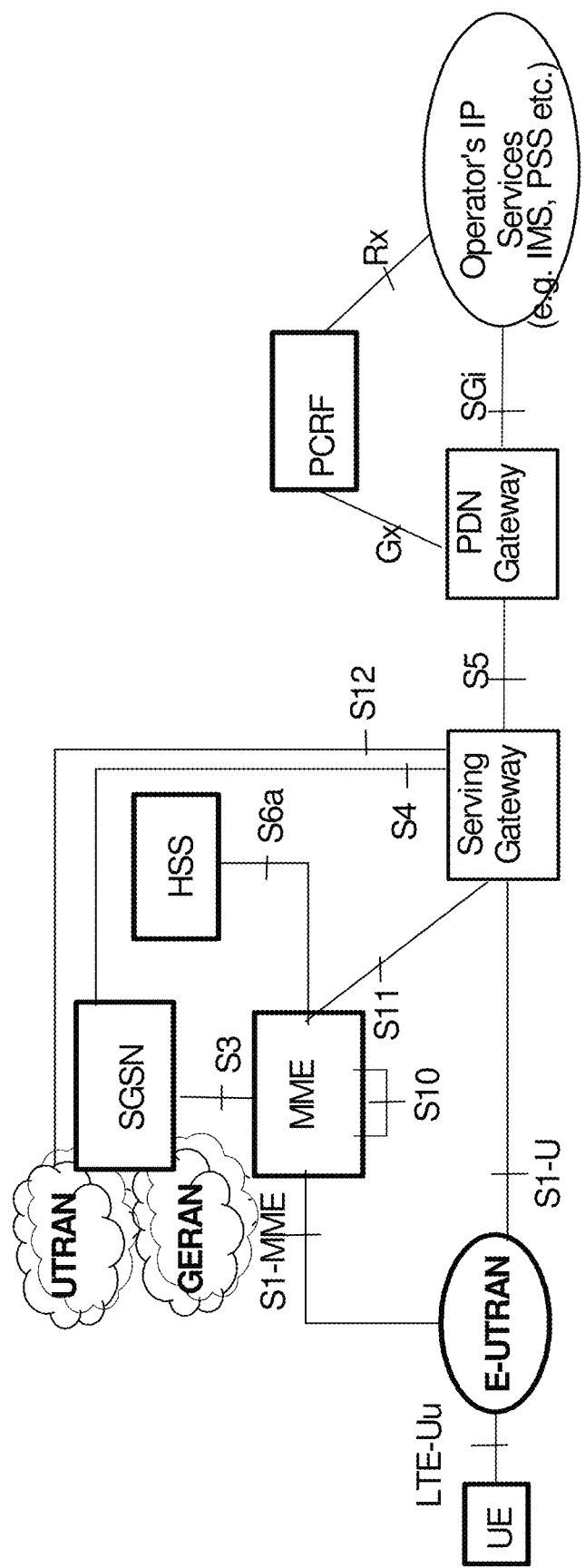
FIG. 1 is a schematic overview depicting a wireless communication network according to prior art.
Figure 2:
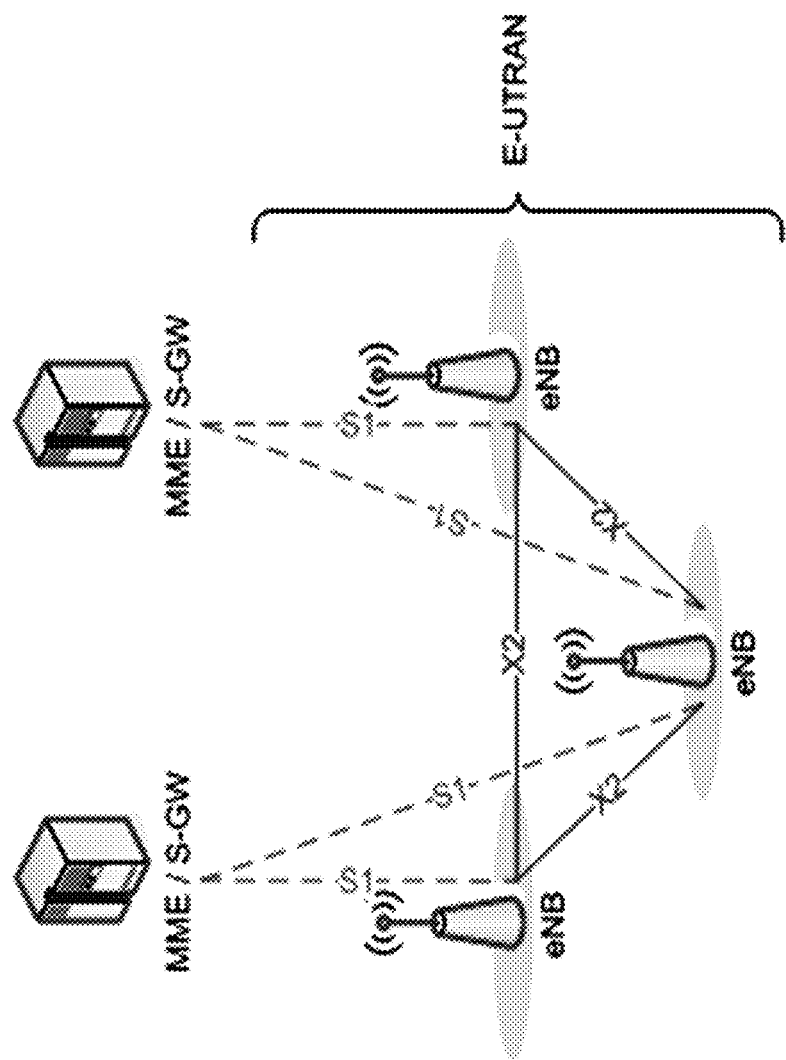
FIG. 2 is a schematic overview depicting a radio access network in connection with a core network.
Figure 3:
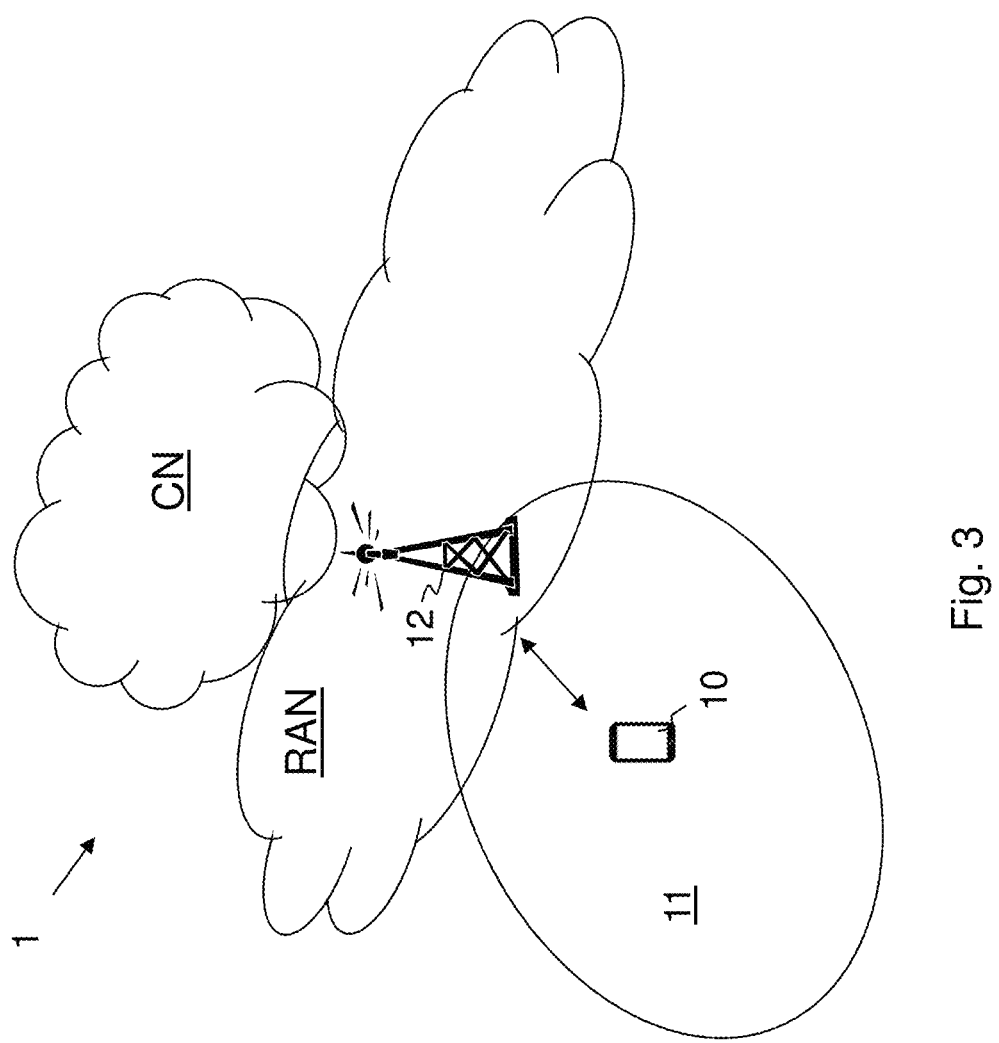
FIG. 3 is a schematic overview depicting a wireless communication network according to embodiments herein.

Embodiments herein relate to communication networks in general. FIG. 3 is a schematic overview depicting a wireless communication network 1. The wireless communication network 1 comprises one or more RANs e.g. a first RAN (RAN1), connected to a plurality of CNs, exemplified as a first CN (CN1), and a second CN (CN2), all packet switched core networks. The wireless communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the wireless communication network 1, wireless devices e.g. a wireless device 10 such as a mobile station, a non-access point (non-AP) STA, a STA, a user equipment and/or a wireless terminal, are connected via the one or more RANs, to the CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or any device communicating within a cell or service area.

The wireless communication network 1 comprises a radio network node 12 providing radio coverage over a geographical area, a service area 11, of a radio access technology (RAT), such as LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the service area served by the radio network node 12 depending e.g. on the radio access technology and terminology used.

It should be noted that a service area may be denoted as 'cell', beam, beam group or similar to define an area of radio coverage.

According to embodiments a CSI filtering is determined in an efficient manner. The wireless device 10 determines a recommended CSI filtering that is transmitted to the radio network node 12, the wireless device 10 may also determine an update rate of CSI reporting. The radio network node 12 then, based on the recommended CSI filtering, configures the wireless device with a determined CSI filtering, i.e. a first configuration is transmitted to the wireless device 10 indicating a determined CSI filtering, which has been determined at the radio network node 12 taking the recommended CSI filtering into consideration. The radio network node 12 may further also configure the wireless device 10 with an update rate or request the wireless device for CSI with a desired update rate. This update rate may take the determined update rate at the wireless device 10 into account. By letting the radio network node 12 and the wireless device 10 coordinate a selection of the CSI filtering, a more appropriate CSI filtering may be used leading to an improved performance of the wireless communication network 1. Furthermore, by letting the wireless device 10 and the radio network node 12 coordinate the update rate optimization of the CSI reported to the radio network node 12 may be achieved.

Figure 4:
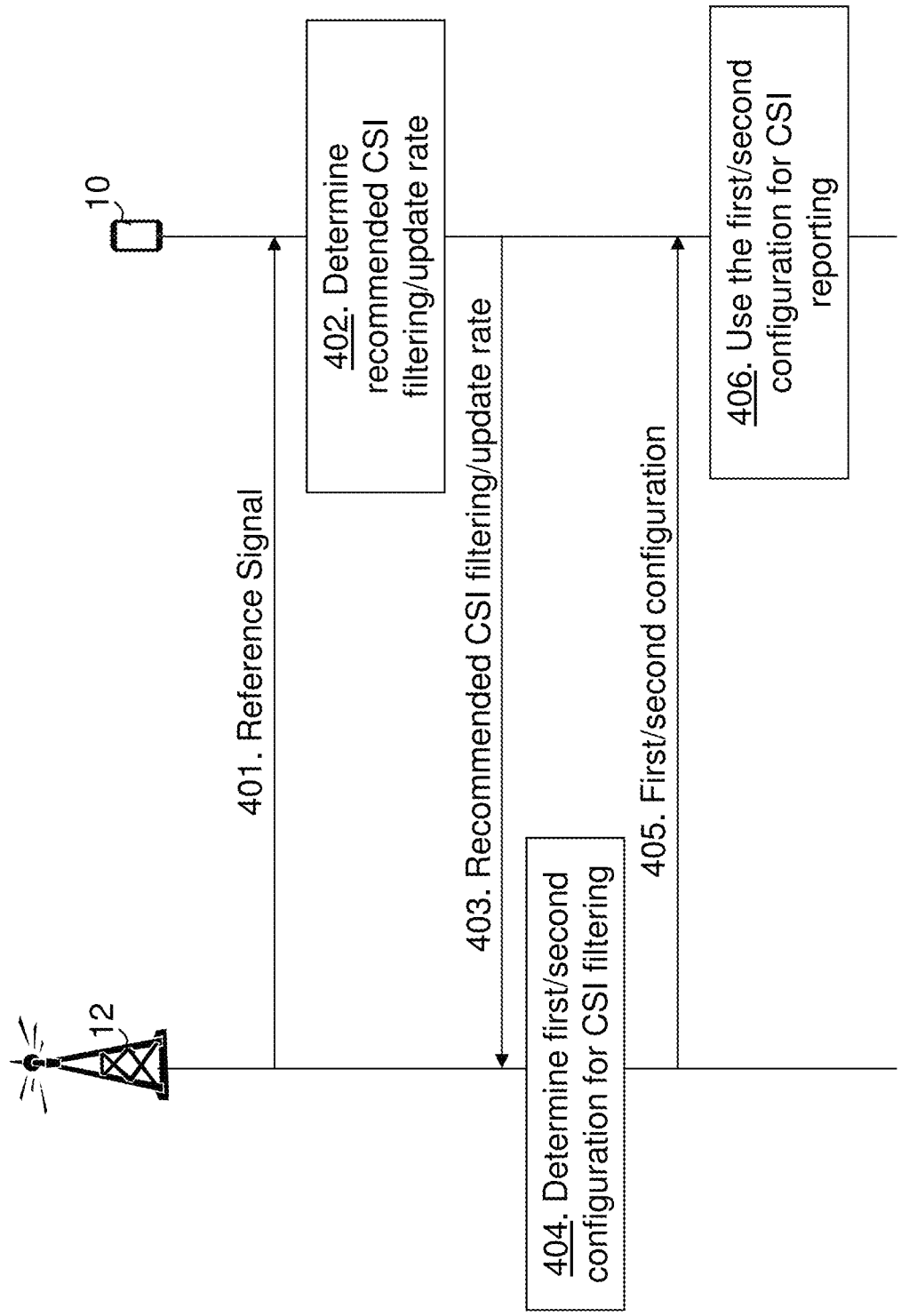
FIG. 4 is a combined flowchart and signalling scheme according to embodiments herein.

FIG. 4 is a combined flowchart and signalling scheme according to some embodiments herein.

Action 401.

The radio network node 12 transmits one or more reference signals to the wireless device 10 either as dedicated signalling or broadcasted over the service area 11.

Action 402.

The wireless device 10 performs measurements on the one or more reference signals from the radio network node 12. The wireless device 10 then determines the recommended CSI filtering of the measuring for CSI reporting. The wireless device 10 may also determine the update rate, i.e. how often the wireless device 10 is to report CSI measurement to the radio network node 12, in this context the CSI filtering determines how to derive a good estimate of the CSI and the update rate how often said estimate changes significantly. Significantly can for example be that the estimate change is sufficient to change a selected precoder from a configured codebook. Thus, wireless device 10 may determine desired CSI filtering and desired update rate. The recommended CSI filtering and update rate may be determined based on measurements on received reference signals, e.g. synchronization reference signals, demodulation reference signals.

Action 403.

The wireless device 10 then transmits the recommended CSI filtering to the radio network node 12. In some embodiments, the wireless device 10 may further transmit the determined update rate to the radio network node 21.

Action 404.

The radio network node 12 then determines the first configuration of CSI filtering based on the received recommended CSI filtering, i.e. taking the recommended CSI filtering into consideration. The radio network node 12 may also determine a second configuration of periodicity of CSI reporting.

Action 405.

The radio network node 12 then transmits the determined first configuration to the wireless device 10. The radio network node 12 may also transmit the determined the second configuration to the wireless device 10.

Action 406.

The wireless device 10 receives the first and/or the second configuration and uses the first/second configuration when performing CSI reporting or performing measurements for determining CSI. The wireless device 10 receives the first configuration of the CSI filtering which may be same or different from what the recommended CSI filtering.

In this example, the wireless device 10 receives from, and transmits to, the radio network node 12 that it is currently performing communication with. However, normally the wireless device 10 does not care who is the transmitter or receiver of a message; the wireless device 10 performs procedural actions according to a specification and/or configuration.

Figure 5:
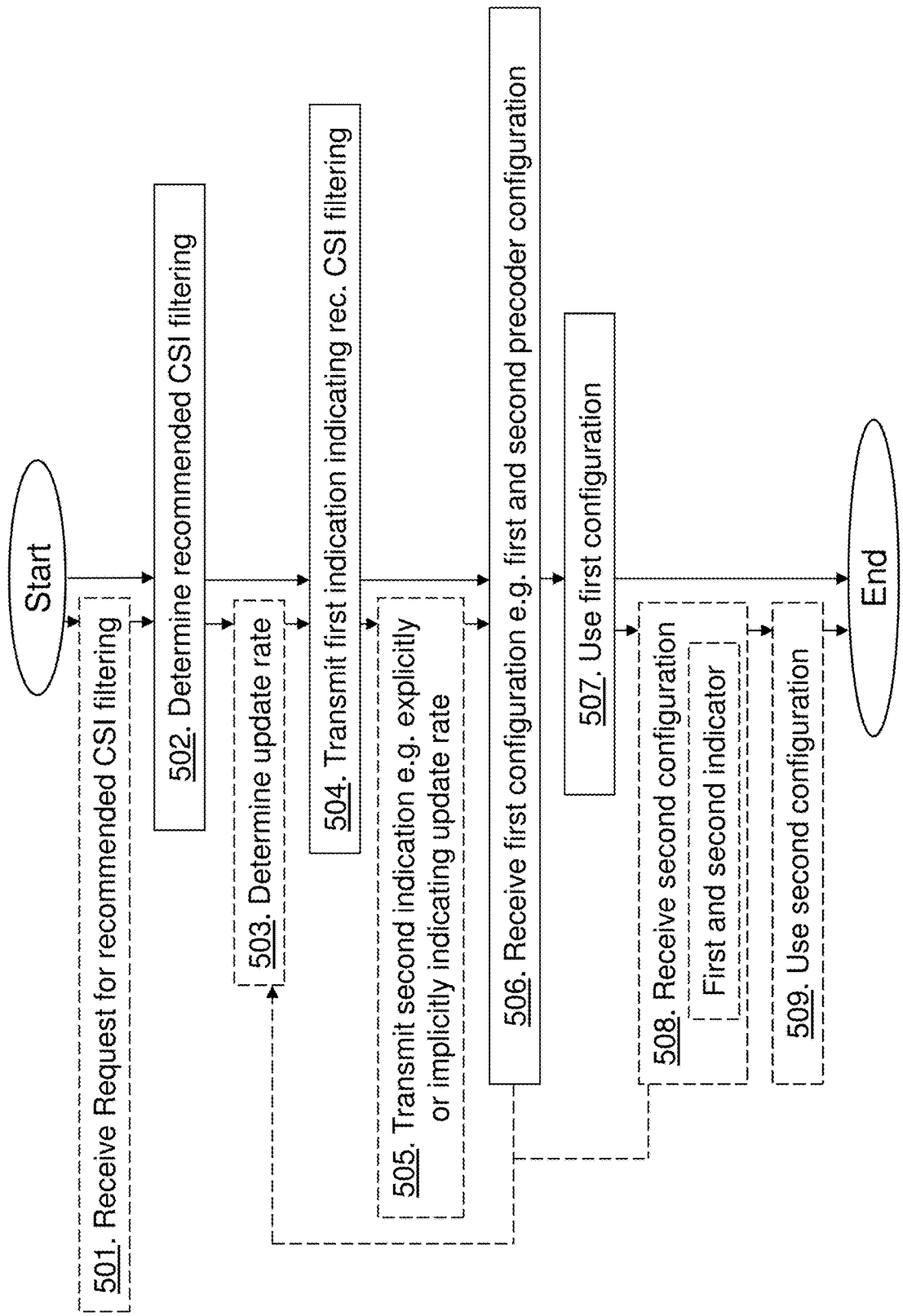
FIG. 5 is a schematic flowchart depicting a method performed by a wireless device according to embodiments herein.

The method actions performed by the wireless device 10 for applying a Channel State Information, CSI, filtering in a wireless communication network according to some embodiments will now be described with reference to a flowchart depicted in FIG. 5. The actions do not have to be taken in the order stated below, but may be taken in any suitable order. Actions performed in some embodiments are marked with dashed boxes.

Action 501.

The wireless device 10 may receive, from the radio network node 12, a request for the recommended CSI filtering.

Action 502.

The wireless device 10 determines the recommended CSI filtering based on measurements of one or more received reference signals from the radio network node 12, examples of measurement values used for said determining of the CSI filtering may be a decorrelation time of the estimated CSI and how noisy the measurements of the CSI are, e.g. high noise leads to longer CSI filtering, low decorrelation time leads to shorter CSI filtering. The wireless device 10 may determine the recommended CSI filtering based on Doppler spread, Rate at which angular of arrival is changed, Angular spread, and Accelerator in the wireless device 10 i.e. speed of the wireless device 10.

Action 503.

The wireless device 10 may determine the update rate of the CSI reporting, for example, by determining the decorrelation time of the filtered estimate of the CSI e.g. typically longer than the decorrelation time of the actual CSI. The wireless device 10 may reduce the update rate if the channel, i.e. the CSI, is observed to be similar, or within an interval of change, for several measurements. A simple example is to check a difference between the currently CSI and a previous CSI and evaluate if the sum-power of the difference is below a certain threshold. This update rate may be determined separately or together with the recommended CSI filtering. The wireless device 10 may determine the recommended CSI filtering and the update rate by determining the update rate of the CSI reporting to a maximal value such as performance loss sum is less or equal to what is achieved with a minimum update rate, e.g. plus an offset parameter. The wireless device 10 may then determine the recommended CSI filtering to a time filtering that minimizes a performance loss sum assuming the maximal value of the determined update rate.

Action 504.

The wireless device 10 transmits, to the radio network node 12, the first indication of the determined recommended CSI filtering. The transmission of recommended CSI filtering and/or the update rate may in some embodiments be explicitly requested by the radio network node 12, see action 501, while in other embodiments be transmitted without an explicit request. The transmission of the recommended CSI filtering and update rate may for example be comprised in a call setup procedure wherein the wireless device 10 attaches to the network.

Action 505.

The wireless device 10 may transmit the second indication of the determined update rate. The second indication may be transmitted separately or together with the first indication. The second indication of update rate may be a rate value indicating the update rate explicitly or a quality indication indicating the update rate implicitly. For example, implicitly can be a quality value relative to a fixed rate value, hence a low quality value may implicitly indicate a too low update rate. The second indication may be an indicator 'I' according to:

| I | Update Rate [1/s] |
|---|---|
| 0 | 1 |
| 1 | 20 |
| 2 | 100 |
| 3 | 200 |

Action 506.

The wireless device 10 receives, from the radio network node 12 or another radio network node, the first configuration of CSI filtering.

Action 507.

The wireless device 10 uses the received first configuration for applying CSI filtering.

Action 508.

The wireless device 10 may receive from the radio network node 12 or another radio network node, the second configuration of periodicity of CSI reporting. The second configuration may be one or more out of: a configuration of resources to measure on; a configuration of periodic time instances when to perform measurement; a configuration of periodic time instances when to report determined CSI; an indication of average update rate for when measurement can be performed, for a-periodic instances when measurement can be done; and an indication of average update rate when CSI is to be reported, for a-periodic CSI reports. The second configuration may be received separately or together with the first configuration. In some embodiments the wireless device 10 may receive a first indicator indicating a minimum reporting periodicity for a beamforming matrix, defined as feedback 1 above, and a second indicator indicating a minimum reporting periodicity for a precoding matrix, defined as feedback 2 above.

Action 509.

The wireless device 10 may then use the received second configuration when reporting CSI and/or performing measurements for determining CSI.

As stated above the actions may be taken in any suitable order. For example, in some embodiments, the wireless device 10 may receive a first precoder configuration for a first precoder, being a part of the first configuration see action 506, with a first time interval of reporting, being the second configuration see action 508, and a second precoder configuration for a second precoder, being another part of the first configuration see action 506. The wireless device 10 may then determine a second time interval of reporting, the update rate see action 503 and indicated by the dashed arrow, for the second precoder configuration; and then report the determined second time interval, to the radio network node 12 see action 505. The first precoder configuration may be for reporting the beamforming matrix, defined as feedback 1 above, and the second precoder configuration is for reporting a precoding matrix, defined as feedback 2 above, or vice versa. Thus, some embodiments consider a hybrid CSI feedback scheme. Hence, it may be desired to determine the beamforming matrix based on a time-filtered channel $\overline{H}$. It is preferable that the radio network node 12 transmits the CSI-RS for Feedback 1 more often than Feedback 1 is reported. It should be noted for larger number of antennas filtering may give a loss on average if CSI feedback for Feedback 1 is fast enough to track the spatial variations of the channel using the beamforming matrix. With a lower report frequency for Feedback 1 it may not be possible to follow the channel variations if the channel vary outside what can be followed by Feedback 2, given a certain beamforming matrix. This may happen due to reporting cost for Feedback 1 or if the channel vary faster than can be captured, e.g., by a wireless device that moves with a high speed.

In this embodiment the request, in action 501, for CSI filtering and update rate may comprise an indicator indicating a minimum reporting periodicity that the wireless device 10 can expect for Feedback 1, the beamforming matrix, and Feedback 2, the precoding matrix, see action 508. Based on these minimum reporting periodicities, the wireless device 10 can then estimate if observed channel variations can be captured or not.

In the determining of the desired CSI filtering and update rate, actions 502 and 503, the wireless device 10 can use the knowledge of a channel coherence time, which the wireless device 10 can estimate using collected channel measurements, based on various reference signals not necessarily limited to CSI-RS, and for instance an autocorrelation method. Using the information of the channel coherence time, the wireless device 10 can inform the radio network node 12 of the recommended CSI filtering such as filtering parameters and e.g. update rate such as periodicity for channel measurements. Examples of filtering parameters useful for different CSI filtering techniques may be a filtering window-length and a filtering forgetting factor or higher order filters can also be used.

In determining CSI filtering and update rate for the feedback 1 an example is herein described of how to perform a time-filtering by time-filter covariance the matrix $Q_H$. It is well-known that right-singular vectors of $Q_H$ equal the right-singular vectors of H. Hence, without CSI filtering there is no restriction choosing F from $Q_H$ instead of H. Furthermore, choosing F from a filtered $Q_H$ will capture the spatial correlation of the transmitter which is desired.

Based on reference signals, e.g. CSI-RS, the wireless device 10 may obtain a sequence of channel estimates $H_{t_1}$, $H_{t_2}$, ..., $H_{t_n}$ at time instances $t_1, t_2, \ldots, t_n$, where $t_i < t_j$ for $i < j$. Given these channel estimates and minimum feedback periodicities of Feedback 1 and Feedback 2 according to the above, the wireless device 10 determines the recommended CSI filtering and update rate for the beamforming matrix.

Given a beamforming matrix F, a channel estimate $H_L$ and pre-coder P from a codebook $\wp$, the wireless device 10 may estimate the obtained performance in terms of mutual information $MI(H_i FP)$. If the wireless device 10 has determined a beamforming matrix F, a pre-coder P is chosen such that it gives the maximum mutual information $$\max_{P \in \mathcal{P}} MI(H_i FP).$$

Let $F(t_i)$ denote a determined beamforming matrix obtained from $Q_{H_i}$ and let $\overline{F}(t_i, \alpha)$ denote a determined beamforming matrix obtained from a time-filtering of $$Q_{H_{t_1}}, Q_{H_{t_2}}, \ldots, Q_{H_i}$$

determined by a filtering parameter $\alpha$. For $t_j \leq t_i$ define $$D_\alpha(t_i, t_j) = \left| \max_{P \in \mathcal{P}} MI(H_{t_j} \overline{F}(t_i, \alpha) P) - MI(H_{t_j}) \right|.$$

The $D_\alpha(t_i, t_j)$ is a measure of the performance loss at time $t_j$ by using a beamforming matrix obtained at time $t_i$ using a time-filtering parameter value $\alpha$. Define the sum of performance losses between $t_i$ and $t_j$ as:

$$S_\alpha(t_i, t_j) = \Sigma_{t_i \leq t_k \leq t_j} D_\alpha(t_i, t_k).$$

With an update rate p a maximum performance loss sum can be estimated as:

$$S_{max,\alpha}(p) = \max_{t_i, t_j = min\{t_j : t_j \geq t_i + p\}} S_\alpha(t_i, t_j)$$

The wireless device 10 may then determine a CSI report period, or update rate, for Feedback 1 as $$p_{determined} = \max_{p \geq p_{min}} \{p : S_{max,0}(p) \leq S_{max,0}(p_{min}) + \Delta\}.$$

Hence, the wireless device 10 may determine the update rate to be the maximal value such as (unfiltered) performance loss sum is less or equal to what can be achieved with a minimum update rate and e.g. plus an offset parameter $\Delta$. Next the wireless device 10 determines a recommended CSI filtering that minimizes the performance loss sum assuming the determined update rate:

$$\alpha_{determined} = \operatorname*{argmin}_{\alpha}\{S_{max,\alpha}(p_{determined})\}.$$

Once the update rate (period) and the recommended CSI filtering are determined the wireless device 10 may transmit indicators, the first indication and the second indication in action 504, 505, indicating CSI filtering and update rate.

In determining recommended CSI filtering and update rate for the feedback 2 an example is herein described of a CSI feedback scheme for closed-loop pre-coding. The CSI reported for closed-loop pre-coding is in this embodiment based on CSI filtering. A typical wireless device receiver is a Minimum Mean Square Error (MMSE) receiver, which has the weights $$W = P^*H^*(HPP^*H^* + Q_{I+N})^{-1} = (P^*H^*Q_{I+N}^{-1} HP + I)^{-1} P^*H^*Q_{I+N}^{-1},$$

where P is a closed-loop pre-coder to be evaluated. The formula contains $H^*Q_{I+N}^{-1}H$ which can be filtered in a similar way as $Q_H$ in the above embodiment. It can also be noted that $Q_{I+N}^{-1}$ may be replaced with an inverse of the filtered interference and noise covariance matrix $\overline{Q}_{I+N}$. Hence, first the interference and noise covariance matrix can be filtered then the inverse of the filtered covariance matrix $\overline{Q}_{I+N}^{-1}$ as input of another filtering of $H^*\overline{Q}_{I+N}^{-1}$.

Figure 6:
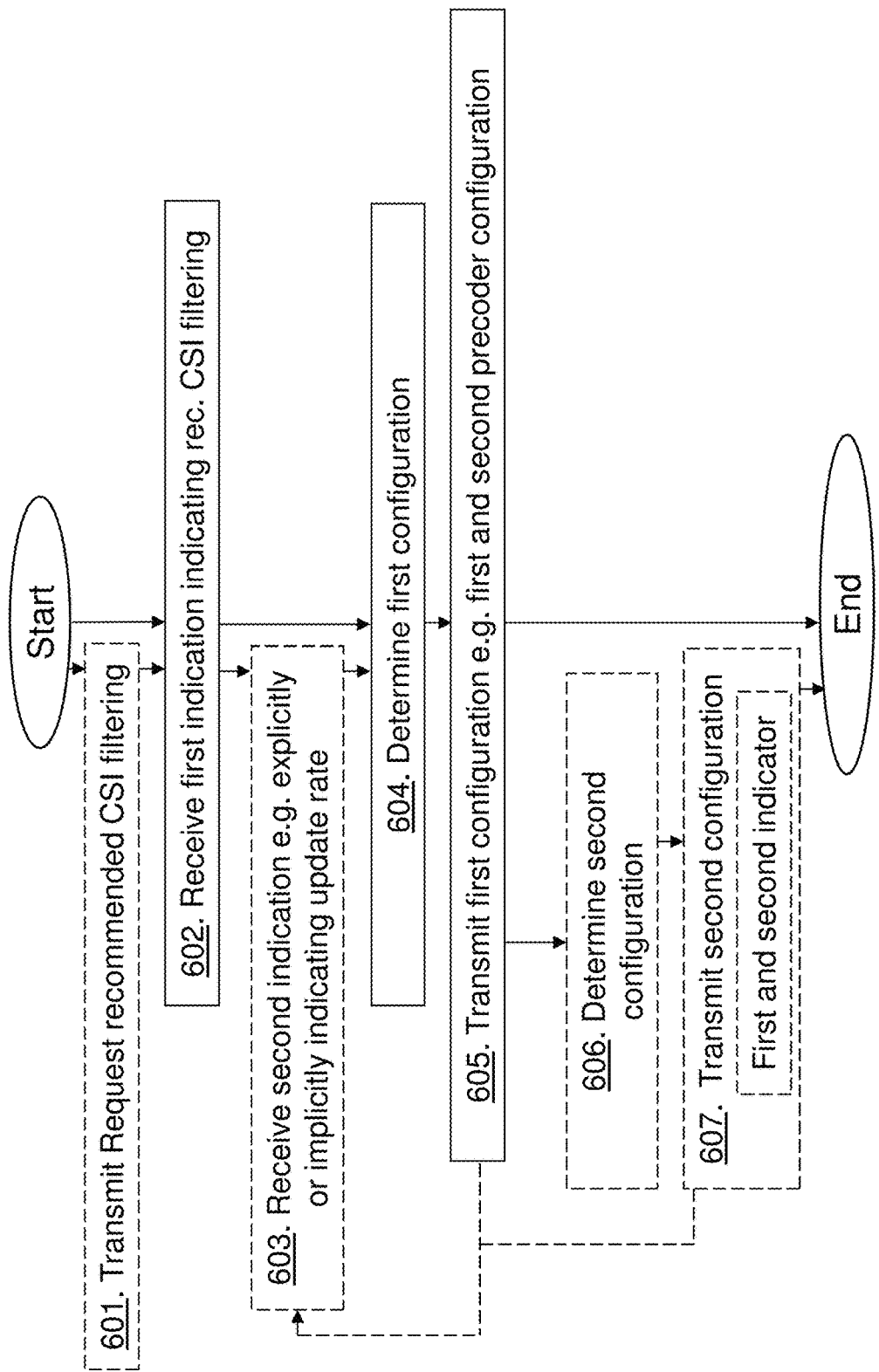
FIG. 6 is a schematic flowchart depicting a method performed by a radio network node according to embodiments herein.

The method actions performed by the radio network node 12 for handling a CSI filtering in a wireless communication network 1 according to some embodiments will now be described with reference to a flowchart depicted in FIG. 6. The actions do not have to be taken in the order stated below, but may be taken in any suitable order. Actions performed in some embodiments are marked with dashed boxes.

Action 601.

The radio network node 12 may transmit, to the wireless device 10, the request for the recommended CSI filtering.

Action 602.

The radio network node 12 receives, from the wireless device 10, the first indication of the recommended the CSI filtering.

Action 603.

The radio network node 12 may receive the second indication of the update rate of the CSI reporting. The second indication of update rate may be a rate value indicating the update rate explicitly or a quality indication indicating the update rate implicitly.

Action 604.

The radio network node 12 determines the first configuration of CSI filtering based on the received recommended CSI filtering. The radio network node 12 may determine the first configuration by taking the second indication into account.

Action 605.

The radio network node 12 transmits, to the wireless device 10, the determined first configuration.

Action 606.

The radio network node 12 may determine the second configuration of periodicity of CSI reporting taking the second indication into account. The second configuration may be one or more out of: a configuration of resources to measure on; a configuration of periodic time instances when to perform measurement; a configuration of periodic time instances when to report determined CSI; an indication of average update rate for when measurement can be performed, for a-periodic instances when measurement can be done; and an indication of average update rate when CSI is to be reported, for a-periodic CSI reports. The second configuration may be transmitted separately or together with the first configuration.

Action 607.

The radio network node 12 may then transmit the second configuration to the wireless device 10. The radio network node 12 may e.g. transmit, to the wireless device 10, the first indicator indicating the minimum reporting periodicity for the beamforming matrix, e.g. denoted feedback 1 above, and the second indicator indicating the minimum reporting periodicity for the precoding matrix, e.g. denoted feedback 2 above.

In some embodiments herein the radio network node 12 transmits, to the wireless device 10, the first precoder configuration for the first precoder, being an example of a part of the first configuration in action 605, with the first time interval of reporting, being an example of a part of the second configuration in action 607, and the second precoder configuration for the second precoder, being an example of a part of the first configuration in action 605. The radio network node 12 receives from the wireless device 10, the second time interval of reporting for the second precoder configuration, being an example of the second indication action 603, and stores the second time interval at the radio network node 12 for e.g. later use. For example, the radio network node 12 may use the second time interval as a recommended update rate. The radio network node 12 may receive recommendations, i.e. several second time intervals, from several wireless devices and may determine an update rate that gives acceptable performance with respect to overhead cost. The first precoder configuration may be for reporting a beamforming matrix and the second precoder configuration may be for reporting a precoding matrix, or vice versa.

Figure 7:
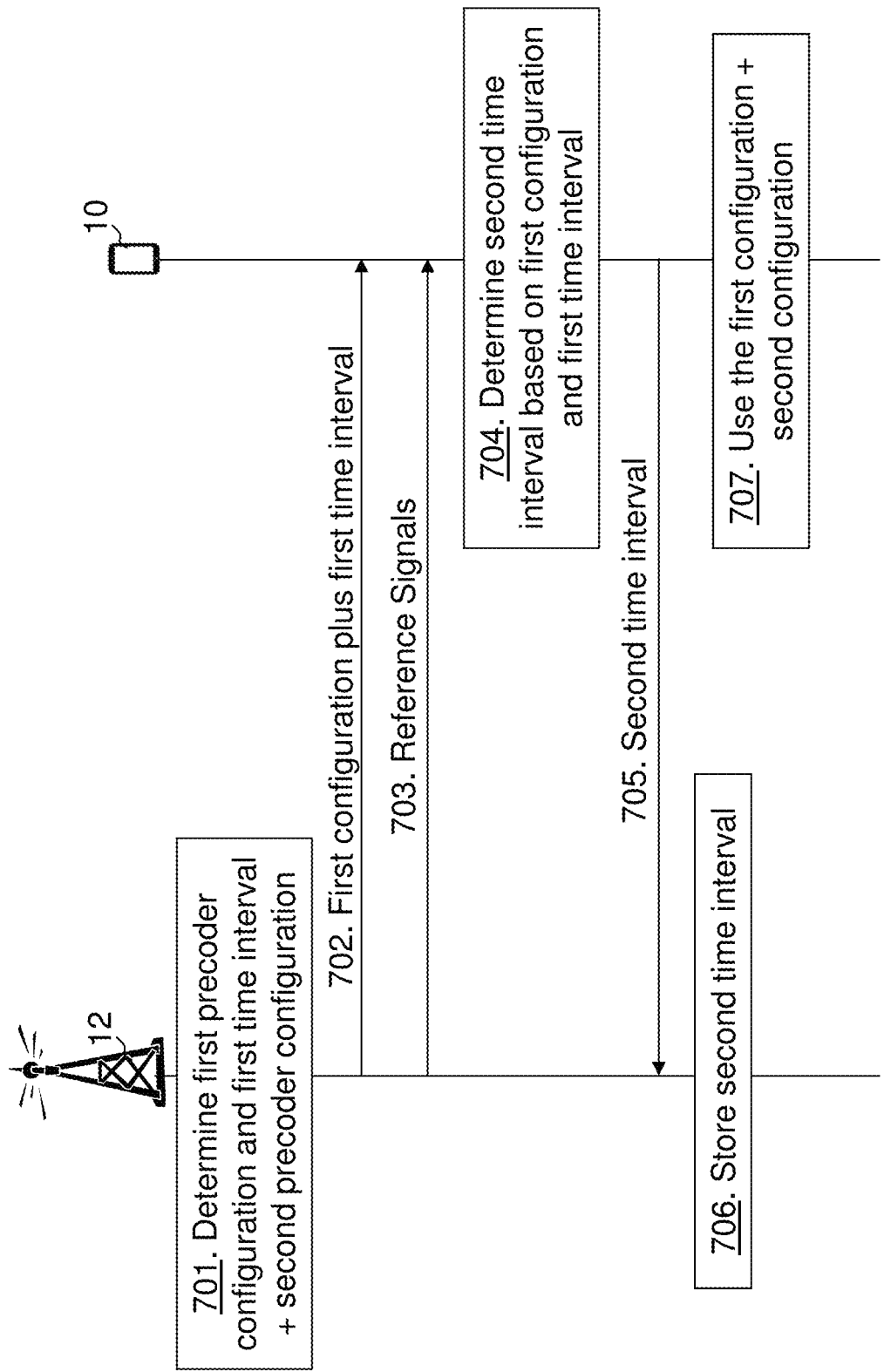
FIG. 7 is a combined flowchart and signalling scheme according to embodiments herein.

FIG. 7 is a combined flowchart and signalling scheme according to embodiments herein.

Action 701.

The radio network node 12 determines the first configuration of CSI filtering, this may be based on recommended CSI filtering and update rate from the wireless device 10. The first configuration may comprise the first precoder configuration for the first precoder. The radio network node 12 may further determine the first configuration by determining the second precoder configuration for the second precoder. The radio network node 12 may further determine at least a part of the second configuration of periodicity of CSI reporting by determine the first time interval for the first precoder. Precoder is an example of CSI or determined from CSI.

Action 702.

The radio network node 12 then transmits, to the wireless device 10, the determined first configuration. Either the first and second precoder configurations are transmitted separately or together. Furthermore, the radio network node 12 transmits the determined part of the second configuration, i.e. the first time interval.

Action 703.

The radio network node 12 then transmits, broadcasted or dedicated signalling, one or more reference signals.

Action 704.

The wireless device 10 may then determine a part of the second configuration of periodicity of CSI reporting, i.e. the second time interval for the second precoder, taking the second precoder configuration into account but also based on the first precoder configuration and first time interval. E.g. the wireless device 10 may measure, filter and report CSI to the radio network node 12 in e.g. a beamforming matrix according to the first precoder configuration and first time interval achieving a resource efficient reporting solution. The wireless device 10 then determines the second time interval for the second precoder to achieve a most accurate CSI as possible by e.g. evaluating different second time intervals for the second precoder such as determining which is the longest period the precoding matrix need to be reported.

Action 705.

The wireless device 10 then transmits the determined second time interval to the radio network node 12.

Action 706.

The radio network node 12 receives and stores the second time interval. The radio network node 12 may use the second time interval as a recommended update rate in the service area 11. As stated above the radio network node 12 may receive recommendations, i.e. several second time intervals, from several wireless devices and may determine an update rate that gives acceptable performance with respect to overhead cost for all wireless devices.

Action 707.

The wireless device 10 may continue to use the first configuration i.e. the first and second precoder configurations, plus the second configuration i.e. the first time interval for the first precoder and the second time interval for the second precoder. Thus, an accurate and resource efficient solution of CSI reporting is achieved.

Figure 8:
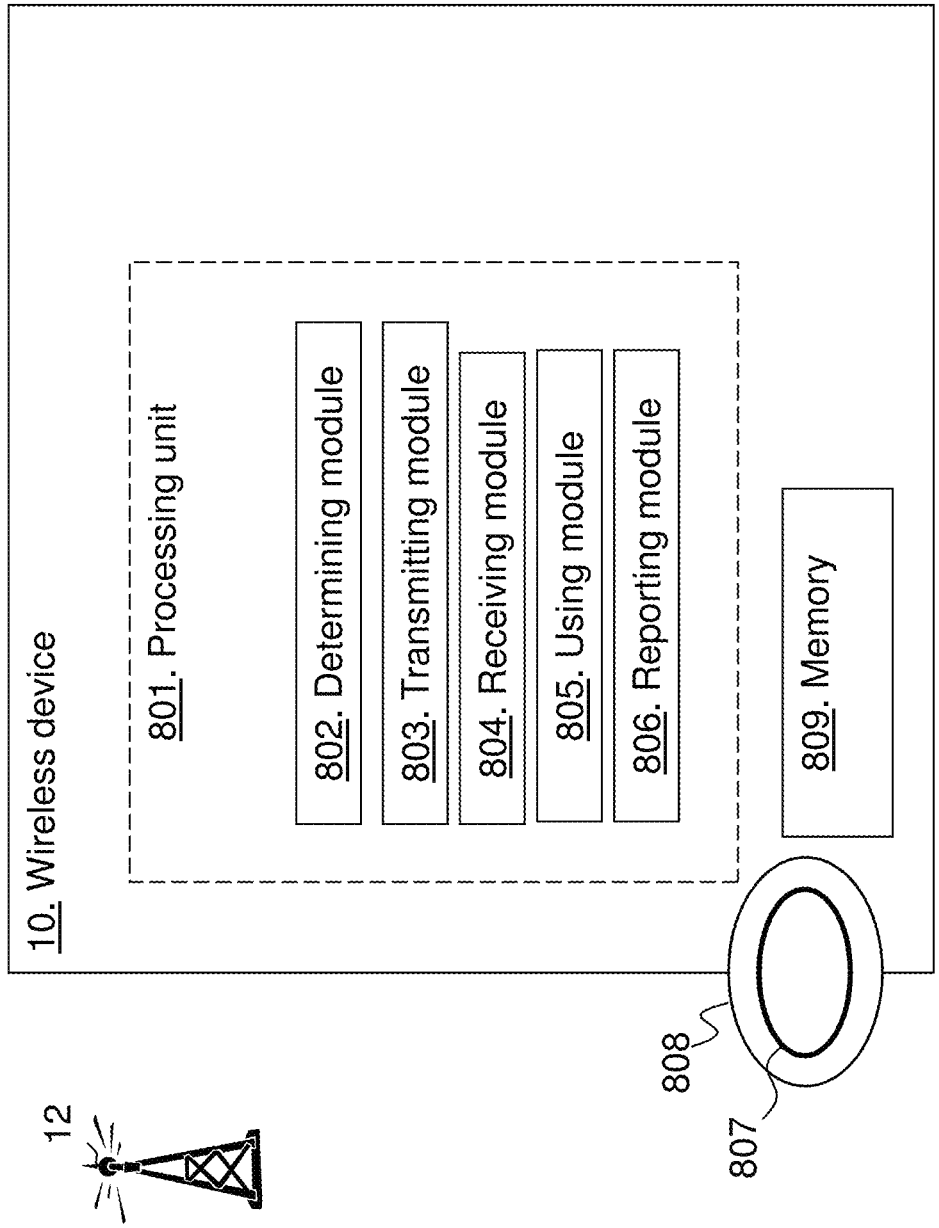
FIG. 8 is a block diagram depicting a wireless device according to embodiments herein.

FIG. 8 is a block diagram depicting the wireless device 10 for applying the CSI filtering in the wireless communication network according to embodiments herein.

The wireless device 10 may comprise a processing unit 801, e.g. one or more processors, configured to perform the methods herein.

The wireless device 10 may comprise a determining module 802. The wireless device 10, the processing unit 801, and/or the determining module 802 may be configured to determine the recommended CSI filtering based on measurements of one or more received reference signals from the radio network node 12. The wireless device 10, the processing unit 801, and/or the determining module 802 may be configured to determine the recommended CSI filtering and the update rate by being configured to determine the update rate of the CSI reporting to a maximal value such as performance loss sum is less or equal to what is achieved with a minimum update rate, and to determine the recommended CSI filtering to a time filtering that minimizes a performance loss sum assuming the maximal value of the determined update rate.

The wireless device 10 may comprise a transmitting module 803. The wireless device 10, the processing unit 801, and/or the transmitting module 803 may be configured to transmit, to the radio network node 12, the first indication of the determined recommended CSI filtering. The wireless device 10, the processing unit 801, and/or the determining module 802 may be configured to determine the update rate of the CSI reporting and the wireless device 10, the processing unit 801, and/or the transmitting module 803 may be configured to transmit the second indication of the determined update rate. The second indication of the determined update rate may be a rate value indicating the update rate explicitly or a quality indication indicating the update rate implicitly.

The wireless device 10 may comprise a receiving module 804. The wireless device 10, the processing unit 801, and/or the receiving module 804 may be configured to receive, from the radio network node 12 or another radio network node, the first configuration of CSI filtering. The wireless device 10, the processing unit 801, and/or the receiving module 804 may be configured to receive, from the radio network node 12, the request for the recommended CSI filtering.

The wireless device 10 may comprise a using module 805. The wireless device 10, the processing unit 801, and/or the using module 805 may be configured to use the received first configuration for applying the CSI filtering. The wireless device 10, the processing unit 801, and/or the receiving module 804 may be configured to receive from the radio network node 12 or another radio network node, the second configuration of periodicity of CSI reporting, and the wireless device 10, the processing unit 801, and/or the using module 805 may be configured to use the received second configuration when reporting CSI and/or performing measurements for determining CSI. The wireless device 10, the processing unit 801, and/or the receiving module 804 may be configured to receive the second configuration by being configured to receive the first indicator indicating a minimum reporting periodicity for a beamforming matrix and the second indicator indicating a minimum reporting periodicity for a precoding matrix.

The wireless device 10, the processing unit 801, and/or the receiving module 804 may be configured to receive the first precoder configuration for the first precoder with the first time interval of reporting, and the second precoder configuration for the second precoder. The wireless device 10, the processing unit 801, and/or the determining module 802 may be configured to determine the second time interval of reporting for the second precoder configuration. The wireless device 10 may further comprise a reporting module 806. The wireless device 10, the processing unit 801 and/or the reporting module 806 may be configured to report the determined second time interval, to the radio network node 12. The first precoder configuration is for reporting the beamforming matrix, i.e. Feedback 1, and the second precoder configuration is for reporting the precoding matrix, Feedback 2, or vice versa.

The methods according to the embodiments described herein for the wireless device 10 are respectively implemented by means of e.g. a computer program 807 or a computer program product, comprising instructions, i.e., software code portions, which, when executed on at least one processor, cause the at least one processor to carry out the actions described herein, as performed by the wireless device 10. The computer program 807 may be stored on a computer-readable storage medium 808, e.g. a disc or similar. The computer-readable storage medium 808, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

The wireless device 10 further comprises a memory 809. The memory comprises one or more units to be used to store data on, such as reference signals, precoder, configurations, indications, time intervals, CSIs, CSI filtering, update rates, applications to perform the methods disclosed herein when being executed, and similar.

Figure 9:
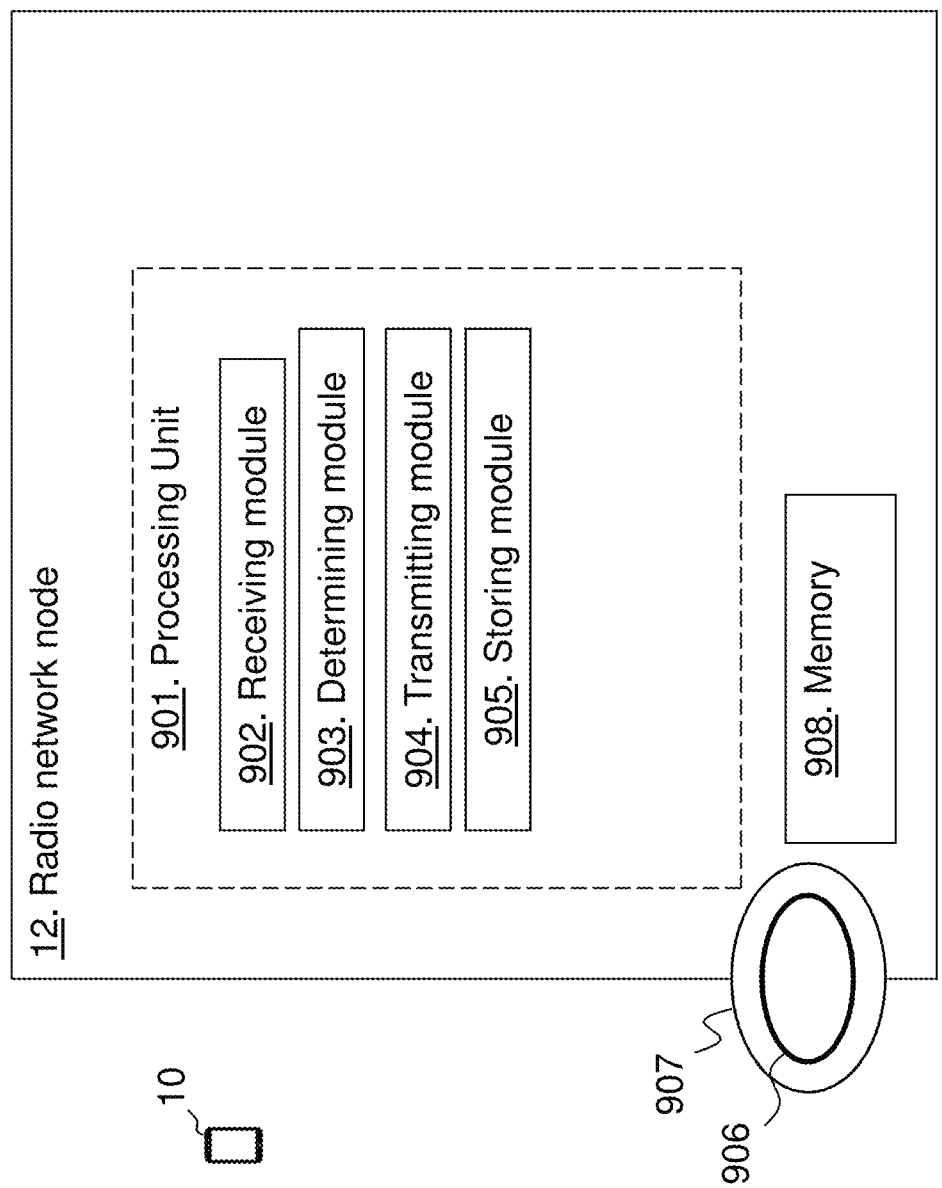
FIG. 9 is a block diagram depicting a radio network node according to embodiments herein.

FIG. 9 is a block diagram depicting the radio network node 12 for handling the CSI filtering in the wireless communication network 1 according to embodiments herein. The radio network node 12 may comprise a processing unit 901, e.g. one or more processors, configured to perform the methods herein.

The radio network node 12 may comprise a receiving module 902. The radio network node 12, the processing unit 901, and/or the receiving module 902 may be configured to receive, from the wireless device 10, the first indication of the recommended CSI filtering.

The radio network node 12 may comprise a determining module 903. The radio network node 12, the processing unit 901, and/or the determining module 903 may be configured to determine the first configuration of CSI filtering based on the received recommended CSI filtering. The radio network node 12, the processing unit 901, and/or the receiving module 902 may be configured to receive the second indication of an update rate of the CSI reporting. The radio network node 12, the processing unit 901, and/or the determining module 903 may be configured to determine the first configuration taking the second indication into account. The second indication of update rate may be a rate value indicating the update rate explicitly or a quality indication indicating the update rate implicitly.

The radio network node 12 may comprise a transmitting module 904. The radio network node 12, the processing unit 901, and/or the transmitting module 904 may be configured to transmit, to the wireless device 10, the determined first configuration. The radio network node 12, the processing unit 901, and/or the transmitting module 904 may be configured to transmit, to the wireless device 10, the request for the recommended CSI filtering. The radio network node 12, the processing unit 901, and/or the determining module 903 may be configured to determine the second configuration of periodicity of CSI reporting taking the second indication into account. The radio network node 12, the processing unit 901, and/or the transmitting module 904 may be configured to transmit the second configuration to the wireless device 10. The radio network node 12, the processing unit 901, and/or the transmitting module 904 may be configured to transmit the second configuration by being configured to transmit to the wireless device 10, the first indicator indicating a minimum reporting periodicity for the beamforming matrix and the second indicator indicating a minimum reporting periodicity for the precoding matrix.

The radio network node 12, the processing unit 901, and/or the transmitting module 904 may be configured to transmit to the wireless device 10, the first precoder configuration for the first precoder with the first time interval of reporting, and the second precoder configuration for the second precoder. The radio network node 12, the processing unit 901, and/or the receiving module 902 may be configured to receive from the wireless device 10, the second time interval of reporting for the second precoder configuration. The radio network node 12 may comprise a storing module 905. The radio network node 12, the processing unit 901, and/or the storing module 905 may be configured to store the second time interval at the radio network node 12. The first precoder configuration may be for reporting the beamforming matrix, Feedback 1, and the second precoder configuration is for reporting the precoding matrix, Feedback 2, or vice versa.

The methods according to the embodiments described herein for the radio network node 12 are respectively implemented by means of e.g. a computer program 906 or a computer program product, comprising instructions, i.e., software code portions, which, when executed on at least one processor, cause the at least one processor to carry out the actions described herein, as performed by the radio network node 12. The computer program 906 may be stored on a computer-readable storage medium 907, e.g. a disc or similar. The computer-readable storage medium 907, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

The radio network node 12 further comprises a memory 908. The memory comprises one or more units to be used to store data on, such as reference signals, precoder, configurations, indications, time intervals, CSIs, CSI filtering, update rates, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or or program or application data, and non-volatile memory. Other hardware, conventional and/or custom, may also be included. Designers of radio network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, the method comprising:
   - determining a recommended CSI filtering based on measurements of one or more received reference signals from a base station;
   - transmitting, to the base station, a first indication of the determined recommended CSI filtering;
   - receiving, from the base station or another base station, a first configuration of CSI filtering; and
   - using the received first configuration for applying CSI filtering.

2. The method according to claim 1, further comprising:
   - receiving, from the base station, a request for a recommended CSI filtering.

3. The method according to claim 1, further comprising:
   - determining an update rate of the CSI reporting and transmitting a second indication of the determined update rate.

4. The method according to claim 3, further comprising:
   - receiving, from the base station or another base station, a second configuration of periodicity of CSI reporting, and
   - using the received second configuration when reporting CSI and/or performing measurements for determining CSI.

5. The method according to the claim 4, wherein the receiving comprises receiving a first indicator indicating a minimum reporting periodicity for a beamforming matrix and a second indicator indicating a minimum reporting periodicity for a precoding matrix.

6. The method according to claim 3, further comprising:

receiving a first precoder configuration for a first precoder with a first time interval of reporting, and a second precoder configuration for a second precoder;

determining a second time interval of reporting for the second precoder configuration; and reporting the determined second time interval, to the base station.

7. The method according to claim 6, wherein the first precoder configuration is for reporting a beamforming matrix and the second precoder configuration is for reporting a precoding matrix, or vice versa.

8. The method according to claim 3, wherein the determining the recommended CSI filtering and the update rate comprises determining the update rate of the CSI reporting to a maximal value such as performance loss sum is less or equal to what is achieved with a minimum update rate, and then determining the recommended CSI filtering to a time filtering that minimizes a performance loss sum assuming the maximal value of the determined update rate.

9. The method according to claim 3, wherein the second indication of update rate is a rate value indicating the update rate explicitly or a quality indication indicating the update rate implicitly.

10. A computer program comprising a non-transitory computer readable medium storing program instructions which, when executed by at least one processor of a user equipment, cause the at least one processor to perform operations according to the method of claim 1.

11. A method performed by a base station, the method comprising:

receiving, from a user equipment, a first indication of a recommended CSI filtering;

determining a first configuration of CSI filtering based on the received recommended CSI filtering; and transmitting, to the user equipment, the determined first configuration.

12. The method according to claim 11, further comprising:

transmitting, to the user equipment, a request for a recommended CSI filtering.

13. The method according to claim 11, further comprising:

receiving a second indication of an update rate of the CSI reporting and the determining the first configuration takes the second indication into account.

14. The method according to claim 13, further comprising:

transmitting, to the user equipment, a first precoder configuration for a first precoder with a first time interval of reporting, and a second precoder configuration for a second precoder;

receiving from the user equipment, a second time interval of reporting for the second precoder configuration; and storing the second time interval at the base station.

15. The method according to claim 14, wherein the first precoder configuration is for reporting a beamforming matrix and the second precoder configuration is for reporting a precoding matrix, or vice versa.

16. The method according to claim 13, wherein the second indication of update rate is a rate value indicating the update rate explicitly or a quality indication indicating the update rate implicitly.

17. The method according to claim 13, further comprising:

determining a second configuration of periodicity of CSI reporting taking the second indication into account, and transmitting the second configuration to the user equipment.

18. The method according to claim 17, wherein the transmitting comprises transmitting to the user equipment, a first indicator indicating a minimum reporting periodicity for a beamforming matrix and a second indicator indicating a minimum reporting periodicity for a precoding matrix.

19. A computer program comprising a non-transitory computer readable medium storing program instructions which, when executed by at least one processor of a base station, cause the at least one processor to perform operations according to the method of claim 11.

20. A user equipment comprising at least one processor adapted to:

determine a recommended CSI filtering based on measurements of one or more received reference signals from a base station;

transmit, to the base station, a first indication of the determined recommended CSI filtering;

receive, from the base station or another base station, a first configuration of CSI filtering; and use the received first configuration for applying CSI filtering.

21. A base station comprising at least one processor adapted to:

receive, from a user equipment, a first indication of a recommended CSI filtering;

determine a first configuration of CSI filtering based on the received recommended CSI filtering; and transmit, to the user equipment, the determined first configuration.

* * * * *